US012780068B2

(12) United States Patent
Kang et al.

(10) Patent No.: US 12,780,068 B2
(45) Date of Patent: Nov. 3, 2026

(54) HEADREST APPARATUS

(71) Applicant: Hyundai Transys Inc., Seosan-si (KR)

(72) Inventors: Guchang Kang, Hwaseong-si (KR); Seongyun Yeo, Incheon (KR); Ui Jeong Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 108 days.

(21) Appl. No.: 18/952,254

(22) Filed: Nov. 19, 2024

(65) Prior Publication Data

US 2025/0178505 A1 Jun. 5, 2025

(30) Foreign Application Priority Data

Nov. 30, 2023 (KR) ........................ 10-2023-0171417

(51) Int. Cl.
*B60N 2/90* (2018.01)
*B60N 2/885* (2018.01)

(52) U.S. Cl.
CPC ............. *B60N 2/914* (2018.02); *B60N 2/885* (2018.02)

(58) Field of Classification Search
CPC ................................ B60N 2/914; B60N 2/885
See application file for complete search history.

(56) References Cited

U.S. PATENT DOCUMENTS

2014/0375100 A1 12/2014 Reese

FOREIGN PATENT DOCUMENTS

| | | | | |
|---|---|---|---|---|
| DE | 102004058788 | A1 * | 6/2006 | ............ B60N 2/914 |
| DE | 102012009366 | A1 * | 11/2013 | |
| KR | 10-2015-0077502 | A | 7/2015 | |
| KR | 10-2019-0068354 | A | 6/2019 | |
| KR | 10-2021-0018544 | A | 2/2021 | |
| WO | 2009/009091 | A1 | 1/2009 | |

* cited by examiner

*Primary Examiner* — Anthony D Barfield
(74) *Attorney, Agent, or Firm* — Bridgeway IP Law Group, PLLC; Jihun Kim

(57) ABSTRACT

A headrest apparatus includes a front frame configured to support an occiput, a rear frame at least partially connected to the front frame and provided at an interval from the front frame, wing frames connected to the front frame by hinge shafts, provided at two opposite sides of the front frame, and configured to be folded about the hinge shafts, elastic members coupled to the hinge shafts and configured to elastically support the wing frames, and air pockets provided between the rear frame and the wing frames and configured to be expanded by injected air to press the wing frames so that the wing frames are folded.

5 Claims, 6 Drawing Sheets

HEADREST APPARATUS

CROSS-REFERENCE TO RELATED APPLICATIONS

This application claims priority to and the benefit of Korean Patent Application No. 10-2023-0171417 filed in the Korean Intellectual Property Office on Nov. 30, 2023, the entire contents of which are incorporated herein by reference.

TECHNICAL FIELD

The present invention relates to a headrest apparatus mounted in a vehicle.

BACKGROUND ART

In general, a seat for a vehicle may include a seatback configured to support a passenger's upper body, a seat cushion configured to support the passenger's lower body such as the passenger's buttocks and thighs, and a headrest configured to support the passenger's occiput.

The headrest may be moved forward or rearward in accordance with the vehicle passenger's occiput. The headrest may be moved forward or rearward by a sliding device.

The headrest may include a front frame configured to support the passenger's occiput, a rear frame provided at an interval from the front frame, and wing frames provided at two opposite sides of the front frame.

The wing frames may be connected to the front frame and hinge shafts. The wing frames in an unfolded state may be folded about the hinge shafts. The wing frames may be folded about the hinge shafts and comfortably and cozily surround two opposite surfaces of the vehicle passenger's head. The wing frames may surround the two opposite surfaces of the passenger's head and provide stability and comfort for the vehicle passenger.

However, it is difficult to adjust an angle of the wing frame of the headrest in the related art, and it is impossible to finely adjust the angle of the wing frame.

DOCUMENT OF RELATED ART

Patent Document (Patent Document 1) Korean Patent Application Laid-Open No. 10-2015-0077502 (published on Jul. 8, 2015)

SUMMARY OF THE INVENTION

The present invention has been made in an effort to provide a headrest apparatus in which a wing frame is folded by pressing the wing frame by expanding an air pocket by injecting air, or the wing frame is unfolded to an original state by discharging air from the air pocket.

In order to achieve the above-mentioned object, the present invention provides a headrest apparatus including: a front frame configured to support an occiput; a rear frame at least partially connected to the front frame and provided at an interval from the front frame; wing frames connected to the front frame by hinge shafts, provided at two opposite sides of the front frame, and configured to be folded about the hinge shafts; elastic members coupled to the hinge shafts and configured to elastically support the wing frames; and air pockets provided between the rear frame and the wing frames and configured to be expanded by injected air to press the wing frames so that the wing frames are folded.

In addition, a connection part may be provided at one side of the air pocket, and the connection part may be connected to the hinge shaft.

In addition, air may be injected into the air pocket by an air injection device.

In addition, the air injection device may include: a first hose configured to be supplied with air; a second hose connected to the first hose and connected to the air pocket positioned at one side of the rear frame; and a third hose connected to the first hose and connected to the air pocket positioned at the other side of the rear frame.

In addition, the air injection device may further include a connection tube configured to connect the first hose, the second hose, and the third hose.

In addition, the connection tube may be configured in a shape such as a "T" shape so that three-way hoses including the first hose, the second hose, and the third hose are connected to the connection tube.

In addition, the connection tube may include: a first connection portion connected to the first hose; a second connection portion connected to the second hose; and a third connection portion connected to the third hose.

In addition, at least a part of the first connection portion may be configured as a stretchable corrugated portion.

In addition, a pneumatic control valve may be mounted in the first hose.

In addition, the pneumatic control valve may be opened when air is injected into or discharged from the air pocket, and the pneumatic control valve may be closed when air is completely injected into the air pocket.

According to the present invention, the wing frame may be folded by pressing the wing frame by expanding the air pocket by injecting air, or the wing frame may be unfolded to the original state by discharging air from the air pocket.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
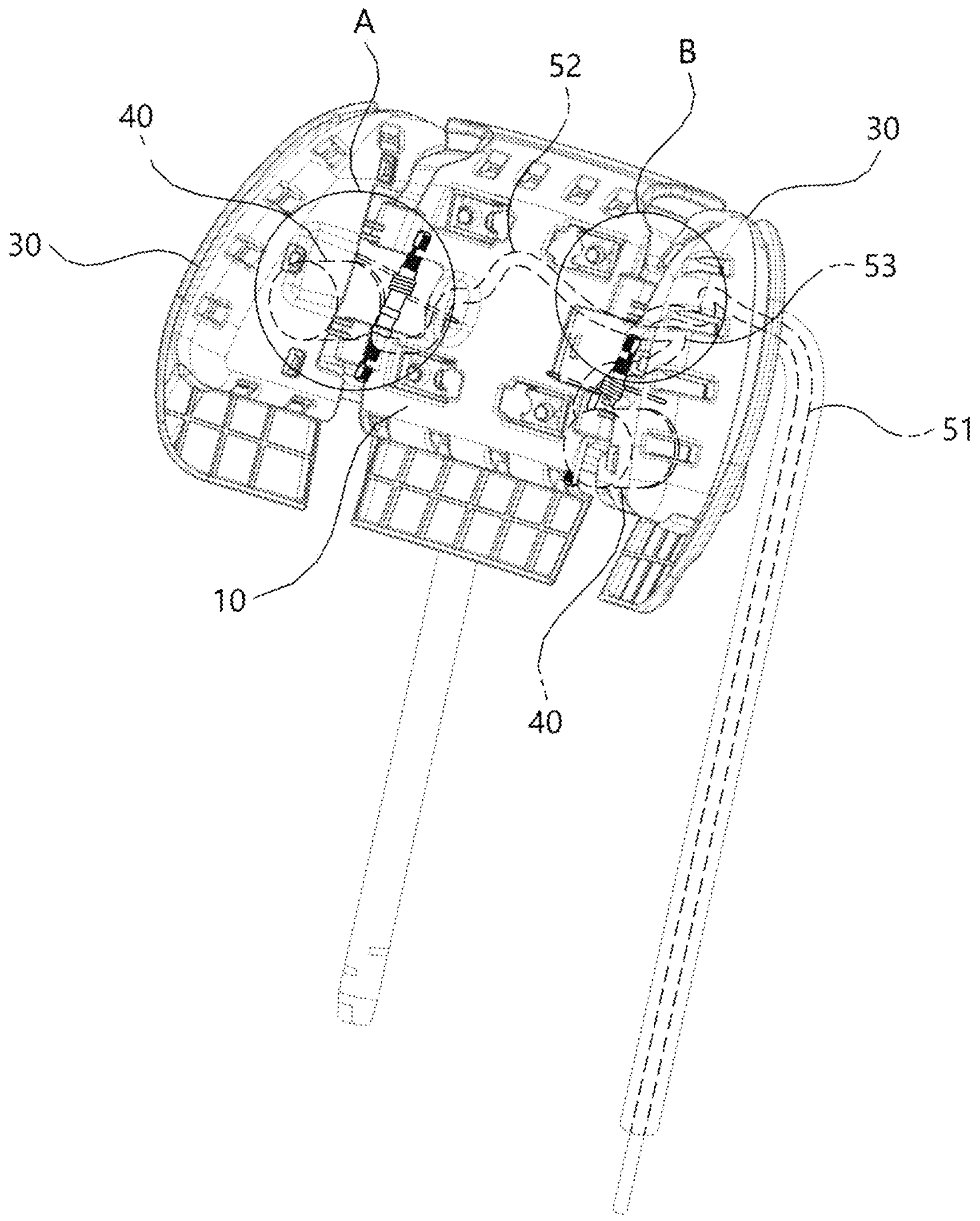
FIG. 1 is a perspective view of a headrest apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
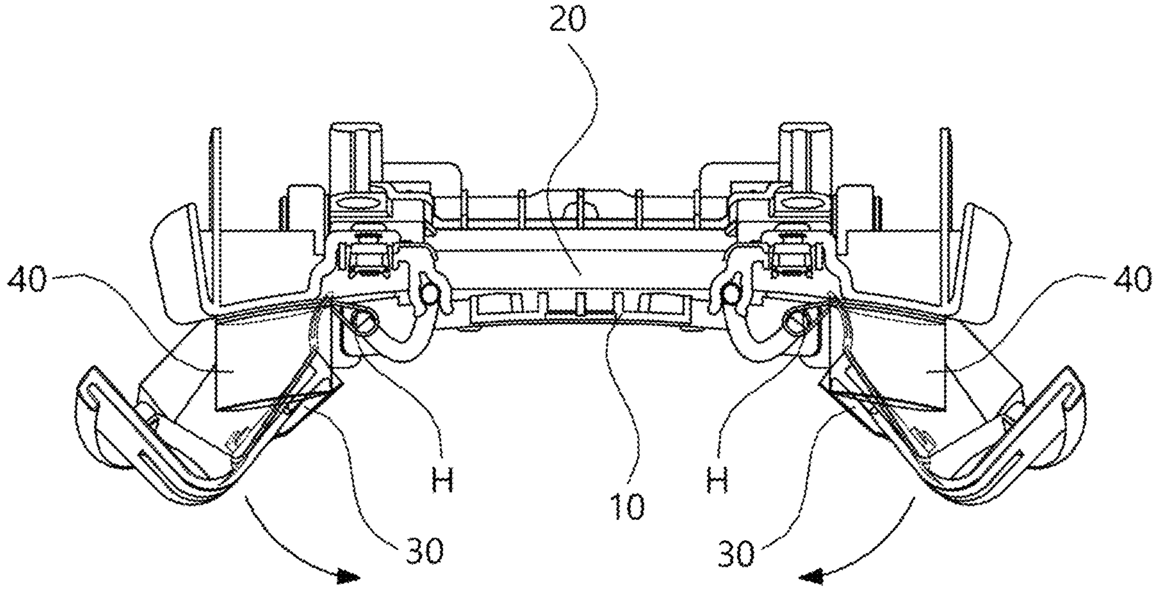
FIG. 2 is a top plan view illustrating a folded state of wing frames of the headrest apparatus according to the exemplary embodiment of the present invention.
Figure 3:
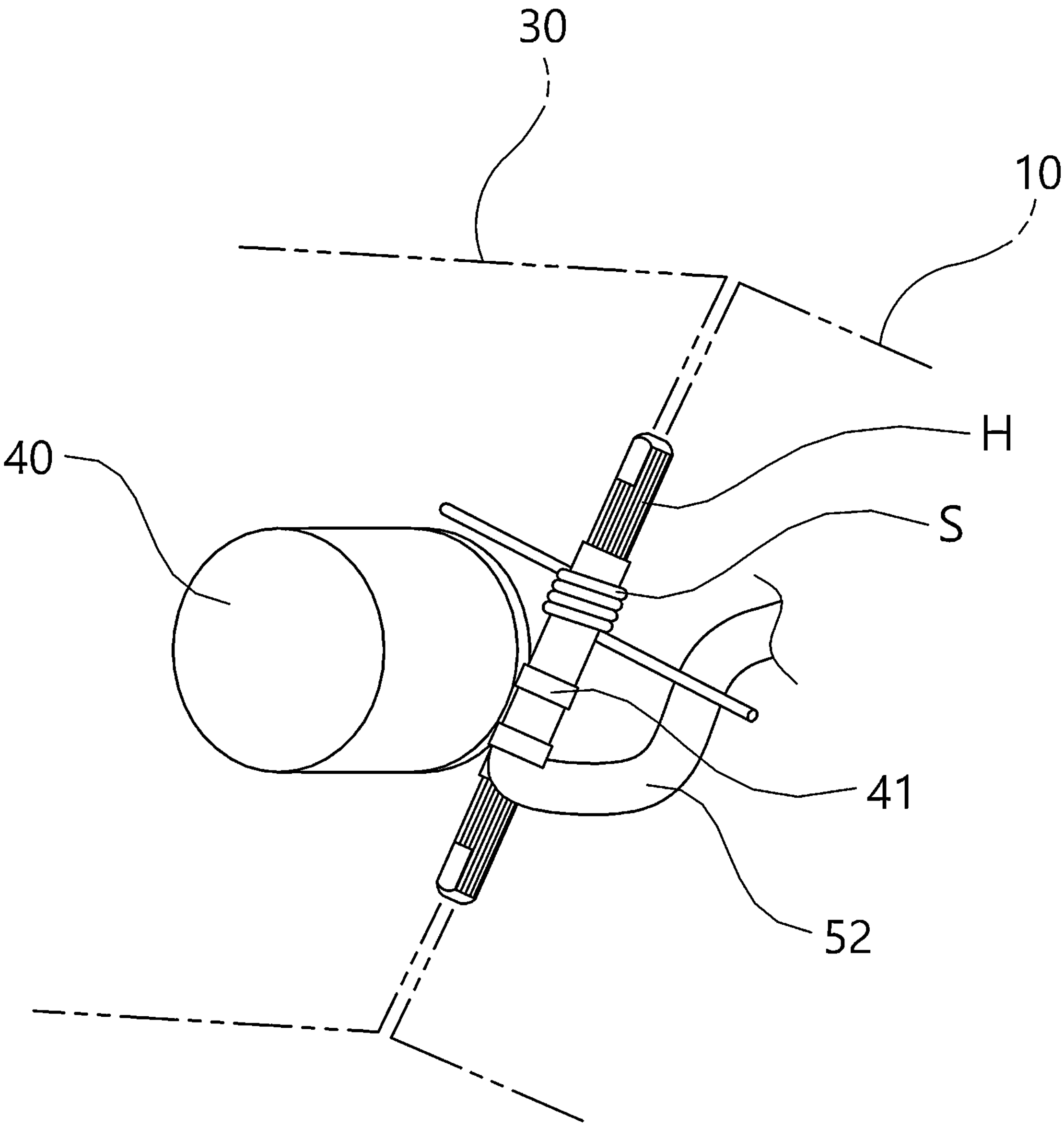
FIG. 3 is an enlarged view of part A in FIG. 1, i.e., a view illustrating an expanded state of an air pocket.

FIG. 1 is a perspective view of a headrest apparatus according to an exemplary embodiment of the present invention, FIG. 2 is a top plan view illustrating a folded state of wing frames of the headrest apparatus according to the exemplary embodiment of the present invention, and FIG. 3 is an enlarged view of part A in FIG. 1, i.e., a view illustrating an expanded state of an air pocket.

As illustrated in FIGS. 1 to 3, a headrest apparatus of the present invention may include a front frame 10, a rear frame 20 provided at an interval from the front frame 10, wing frames 30 provided at two opposite sides of the front frame 10, elastic members S configured to elastically support the wing frames 30, and air pockets 40 configured to press the wing frames 30 by being expanded by injected air.

The front frame 10 may be provided above a vehicle seat (not illustrated) and support a vehicle passenger's occiput.

The rear frame 20 may be configured to be at least partially connected to the front frame 10. The rear frame 20 may be provided at an interval from the front frame 10.

The wing frames 30 may be provided at two opposite left and right sides of the front frame 10. The wing frames 30 may be connected to the front frame 10 by hinge shafts H. The wing frame 30 may be folded about the hinge shaft H.

The elastic member S may be coupled to the hinge shaft H. The elastic member S may elastically support the wing frame 30. For example, the elastic member S may be a torsion spring.

The air pocket 40 may be positioned between the rear frame 20 and the wing frame 30. Air may be injected into the air pocket 40. Air is injected into the air pocket 40, such that the air pocket 40 may be expanded. The air pockets 40 press the wing frames 30 while being expanded, such that the wing frames 30 may be folded. The wing frames 30 may stably support two opposite sides of the vehicle passenger's head by being folded.

The air pocket 40 may have a connection part 41. The connection part 41 may extend from one side of the air pocket 40 and be connected to the hinge shaft H.

A shape of the air pocket 40 is not limited. The air pocket 40 may have any shape as long as the air pocket 40 is expandable. For example, the air pocket 40 may be formed in a circular shape.

Figure 4:
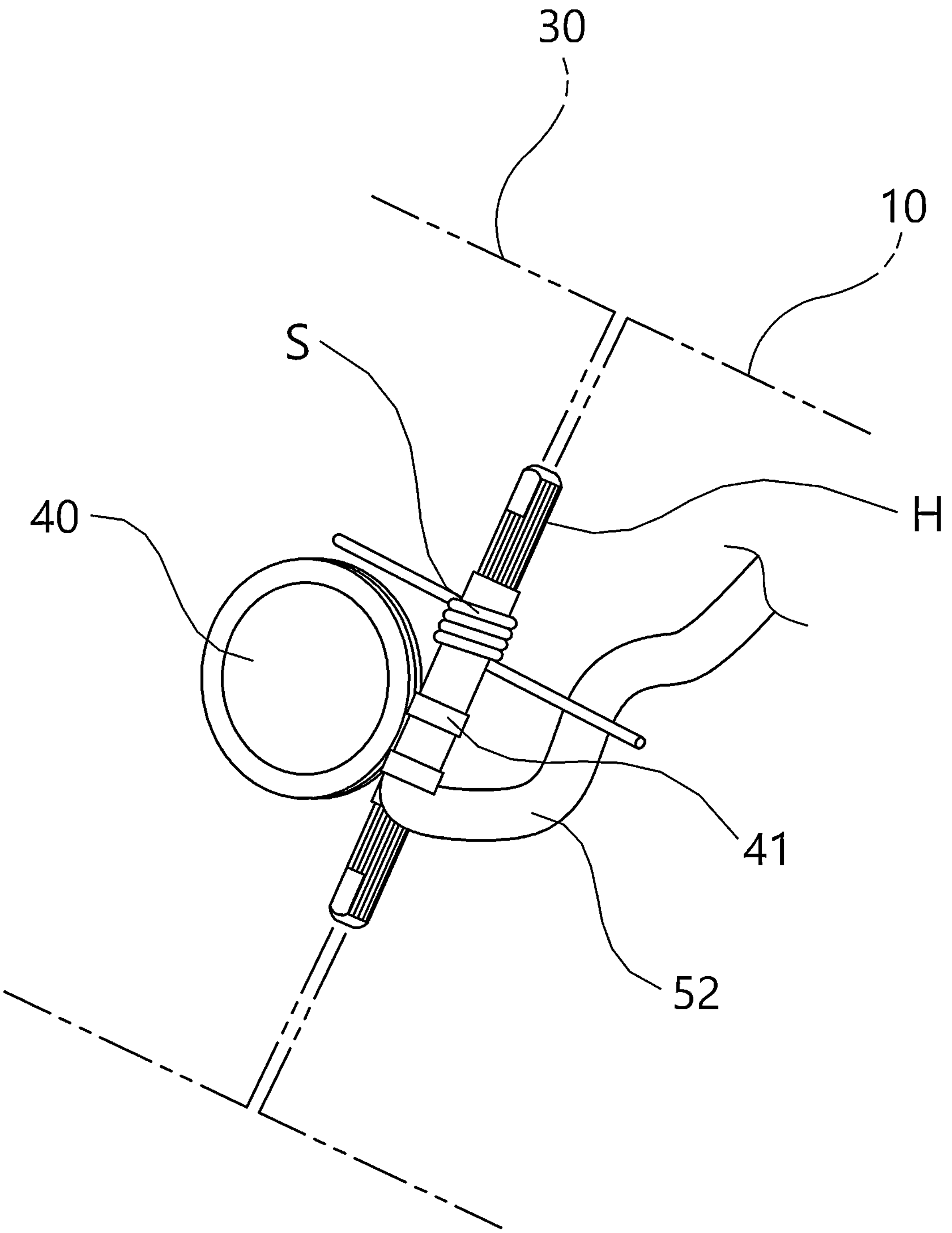
FIG. 4 is a view illustrating a contracted state of the air pocket in FIG. 3.

FIG. 4 is a view illustrating a contracted state of the air pocket in FIG. 3.

As illustrated in FIG. 4, when the air in the air pocket 40 is discharged, the air pocket 40 is contracted to an original state, and a force for pressing the wing frame 30 is eliminated, such that the wing frame 30 may be unfolded to the original state.

Figure 5:
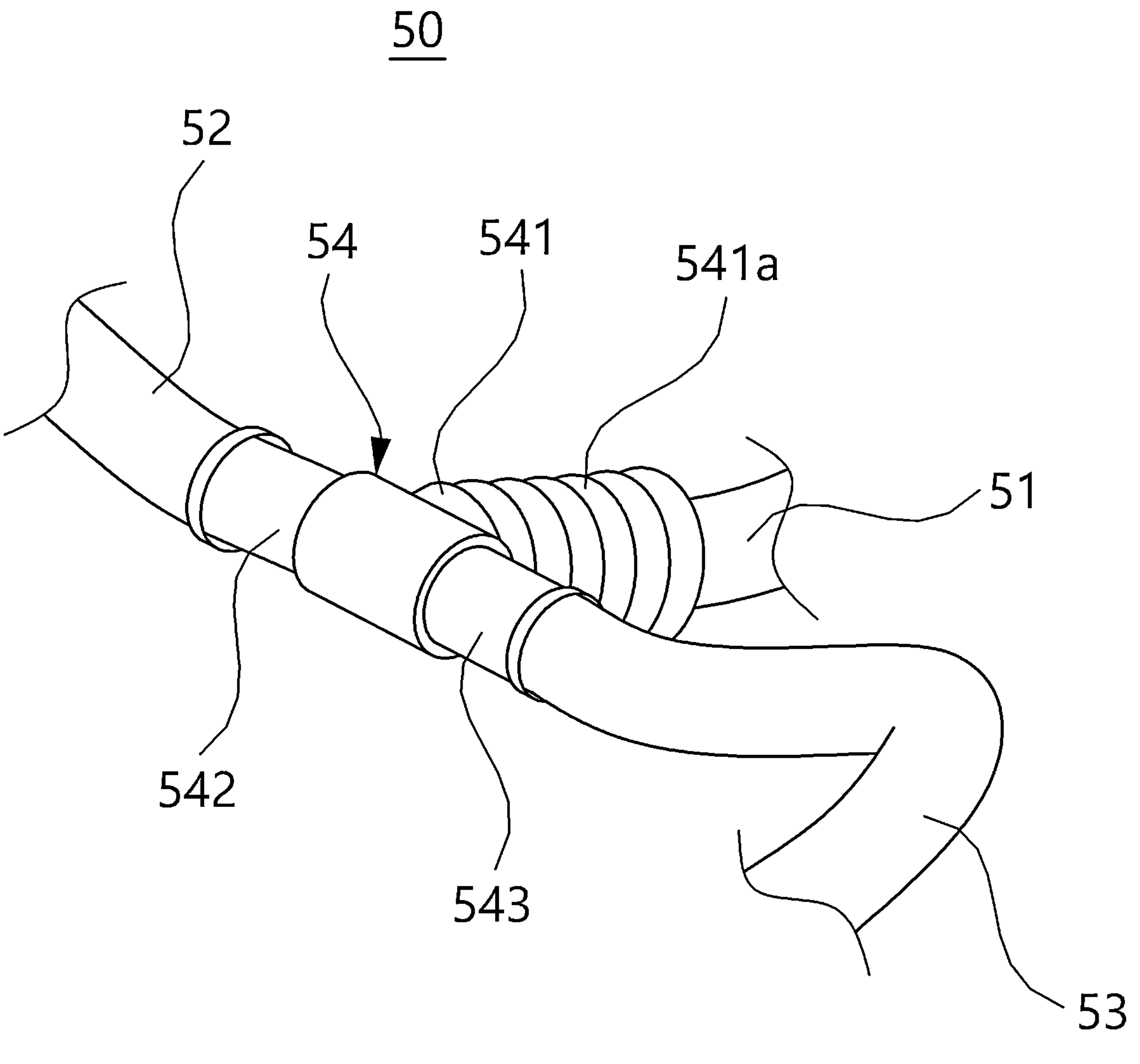
FIG. 5 is an enlarged view of part B in FIG. 1, i.e., a view illustrating an extended state of a corrugated portion.

FIG. 5 is an enlarged view of part B in FIG. 1, i.e., a view illustrating an extended state of a corrugated portion.

As illustrated in FIGS. 1 and 5, an air injection device 50 may inject air into the air pocket 40.

The air injection device 50 may include a first hose 51, a second hose 52, a third hose 53, and a connection tube 54.

Air may be supplied to the first hose 51. The air supplied to the first hose 51 may be supplied to two opposite sides, i.e., the second hose 52 and the third hose 53.

The air supplied to the second hose 52 may be supplied into one side air pocket 40 provided between one side of the rear frame 20 and one side wing frame 30.

The air supplied to the third hose 53 may be supplied into the other side air pocket 40 provided between the other side of the rear frame 20 and the other side wing frame 30.

One side of the second hose 52 may be connected to the first hose 51. The other end of the second hose 52 may be connected to one side air pocket 40.

One end of the third hose 53 may be connected to the first hose 51. The other end of the third hose 53 may be connected to the other side air pocket 40.

The first hose 51, the second hose 52, and the third hose 53 may be connected by the connection tube 54.

The connection tube 54 may be provided in a shape such as a "T" shape so that three-way hoses including the first hose 51, the second hose 52, and the third hose 53 may be connected to the connection tube 54.

The connection tube 54 may include a first connection portion 541, a second connection portion 542, and a third connection portion 543. The first connection portion 541 may be connected to the first hose 51. The second connection portion 542 may be connected to the second hose 52. The third connection portion 543 may be connected to the third hose 53.

At least a part of the first connection portion 541 may be configured as a stretchable corrugated portion 541*a*.

When the headrest of the present invention is moved forward by a publicly-known sliding device (not illustrated), the corrugated portion 541*a* of the first connection portion 541 may be stretched.

Figure 6:
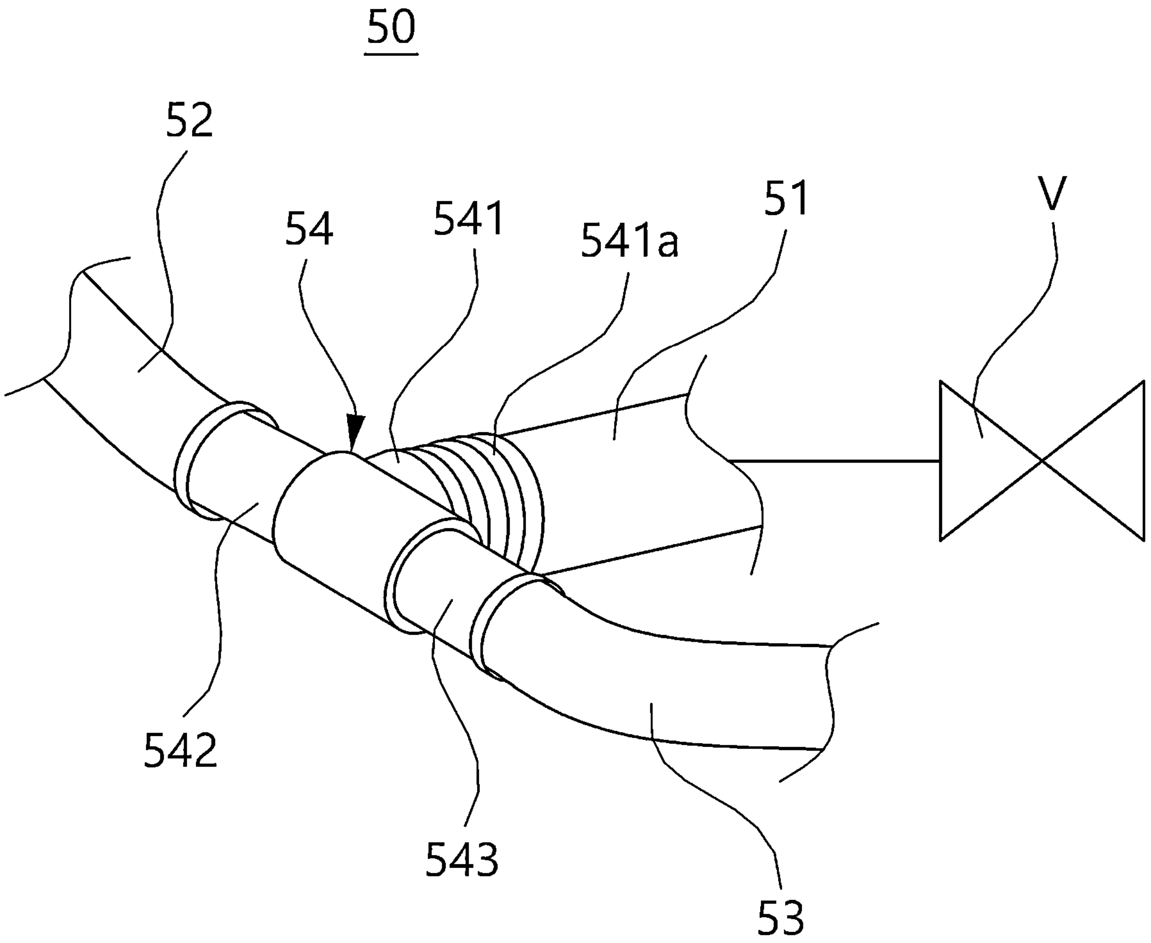
FIG. 6 is a view illustrating a contracted state of the corrugated portion in FIG. 5.

FIG. 6 is a view illustrating a contracted state of the corrugated portion in FIG. 5.

As illustrated in FIG. 6, when the headrest of the present invention is moved rearward by the publicly-known sliding device (not illustrated), the corrugated portion 541*a* of the first connection portion 541 may be contracted to the original state.

The corrugated portion 541*a* of the first connection portion 541 may be stretchable and freely bent as described above, which may prevent damage to the first hose 51 caused when the first hose 51 is bent.

For example, a pneumatic control valve V may be mounted in the first hose 51. For example, the pneumatic control valve V may be a solenoid valve that may control a flow of pneumatic pressure.

The pneumatic control valve V may be opened so that air is injected into the air pockets 40. When the pneumatic control valve V is opened, air may be injected into the air pockets 40 through the first, second, and third hoses 51, 52, and 53.

The pneumatic control valve V may be closed when air is completely injected into the air pockets 40.

The pneumatic control valve V may be opened so that the air in the air pocket 40 is discharged. When the pneumatic control valve V is opened, the air in the air pockets 40 may be discharged to the first hose 51 through the second and third hoses 52 and 53.

Next, an operation of folding the wing frames of the present invention will be described.

As illustrated in FIGS. 1 to 3, when an air supply switch (not illustrated) is operated, air may be supplied to the first hose 51.

The air supplied to the first hose 51 may be supplied into the air pockets 40 at two opposite sides through the second and third hoses 52 and 53.

As the air is supplied into the air pocket 40, the air pocket 40 may be expanded.

A degree to which the air pocket 40 expands may be adjusted by adjusting the amount of injected air. A degree to which the wing frame 30 is folded may be finely adjusted by adjusting the degree to which the air pocket 40 expands.

The air pocket 40 may press the wing frame 30 while expanding. The wing frame 30 may be folded about the hinge shaft H by being pressed by the air pocket 40.

The elastic member S, which elastically supports the wing frame 30, may be compressed as the wing frame 30 is folded.

In case that the wing frame 30 is folded in a desired state, the operation of the air supply switch (not illustrated) may be stopped, such that the supply of air into the air pocket 40 may be cut off.

The wing frames 30 in the folded states may stably support the two opposite sides of the vehicle passenger's head.

As illustrated in FIG. 4, in case that the folded states of the wing frames 30 are intended to be released, an air discharge switch (not illustrated) may be operated, such that the air may be discharged from the air pocket 40.

The air pocket 40 may be contracted to the original state as the air is discharged from the inside of the air pocket 40.

The force for pressing the wing frames 30 is eliminated as the air pockets 40 are contracted, and the compressed elastic members S are stretched to the original states, such that the wing frames 30 may be unfolded to the original states.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A headrest apparatus, comprising:

a front frame configured to support an occiput;

a rear frame at least partially connected to the front frame and disposed at an interval from the front frame;

wing frames connected to the front frame by respective hinge shafts, disposed at two opposite sides of the front frame, and configured to be folded about the hinge shafts;

elastic members coupled to the hinge shafts, respectively, and configured to elastically support the wing frames; and air pockets disposed between the rear frame and the respective wing frames, the air pockets being configured to be expanded by injected air to press the wing frames to fold the wing frames, wherein an air injection device is configured to inject air into the air pocket, wherein the air injection device comprises:

a first hose configured to be supplied with air;

a second hose connected to the first hose and connected to the air pocket positioned at one side of the rear frame; and a third hose connected to the first hose and connected to the air pocket positioned at another side of the rear frame, wherein the air injection device further comprises a connection tube connecting the first hose, the second hose, and the third hose, wherein the connection tube comprises:

a first connection portion connected to the first hose;

a second connection portion connected to the second hose; and a third connection portion connected to the third hose, and wherein at least a part of the first connection portion has a stretchable corrugated portion.

2. The headrest apparatus of claim 1, wherein a connection part is disposed at one side of each of the air pockets, and the connection part is connected to each of the hinge shafts.

3. The headrest apparatus of claim 1, wherein the connection tube has a "T" shape so that three-way hoses including the first hose, the second hose, and the third hose are connected to the connection tube.

4. The headrest apparatus of claim 1, wherein a pneumatic control valve is mounted in the first hose.

5. The headrest apparatus of claim 4, wherein the pneumatic control valve is configured to be opened when air is being injected into or discharged from the air pockets, and the pneumatic control valve is configured to be closed when air is completely injected into the air pockets.

* * * * *